United States Patent Office 3,270,777
Patented Sept. 6, 1966

3,270,777
INCORPORATION OF CARBON BLACK IN MIXTURE OF ALPHA-METHYL STYRENE:ACRYLONITRILE RESIN AND GRAFT COPOLYMER OF STYRENE AND ACRYLONITRILE ON POLYBUTADIENE
Mortimer S. Thompson, North Woodbury, Conn., assignor to United States Rubber Company, New York, N.Y., a corporation of New Jersey
No Drawing. Original application Dec. 19, 1958, Ser. No. 781,434, now Patent No. 3,111,501, dated Nov. 19, 1963. Divided and this application July 15, 1963, Ser. No. 295,607
2 Claims. (Cl. 138—118)

This application is a division of my copending application Serial No. 781,434, filed December 19, 1958, now U.S. Patent 3,111,501.

This invention relates to a gum plastic material and more particularly it relates to a thermoplastic mixture of resinous and rubbery material characterized by the ability to withstand stresses over a wide temperature range, including relatively highly elevated temperature.

The principal object of the invention is to provide a composition having a combination of physical properties which makes it valuable for applications where toughness and high tensile strength and impact strength are required, such as for making plastic pipe.

Previously known gum plastics have not been capable of withstanding high stresses for extended periods of time, especially at elevated temperatures. Thus, previously known compositions based essentially on polyvinyl chloride resin have high tensile strength, but the heat resistance and impact strength are unsatisfactory for many purposes. On the other hand polyvinyl chloride resin modified by addition of small amounts of rubbery materials have good impact strength, but have low tensile strength and the heat resistance is, again, poor. Accordingly, it is an object of the invention to provide a composition which combines good tensile strength and impact resistance with ability to withstand elevated temperatures.

Another object of the invention is to provide a composition, suitable for making plastic pipe, which is highly resistant to "weeping." The term "weeping" is used, especially in plastic pipe technology, to designate a failure which occurs by loss of liquid through a pipe wall after the pipe has been in use under pressure for some time. This type of failure is believed to be due to development of microscopic or sub-microscopic pores in the plastic under the influence of relatively long term application of pressure. Previously known gum plastics have been deficient in this respect.

Still another object of the invention is to provide a gum plastic mixture which achieves a high impact strength at a relatively low rubber to resin ratio. Such low rubber to resin ratio is highly desirable from the standpoint of providing optimum tensile strength.

The invention is based on the unexpected discovery that a gum plastic composition which retains good physical properties at elevated temperatures and is singularly resistant to weeping, while providing a high impact strength at a low rubber to resin ratio, can be made by blending 68 to 85% (by weight) of a resinous copolymer of alpha-methyl styrene and acrylonitrile (containing 65 to 75 parts by weight of alpha-methyl styrene and correspondingly from 35 to 25 parts of acrylonitrile, in 100 parts of the resinous copolymer), and correspondingly from 32 to 15% of a graft copolymer made by copolymerizing a monomeric mixture of styrene and acrylonitrile in an aqueous emulsion of a previously prepared polybutadiene rubber. The graft copolymer is made from 50 to 60 parts (per 100 of graft copolymer) of polybutadiene and correspondingly 50 to 40 parts of styrene plus acrylonitrile.

The ratio of styrene:acrylonitrile in the graft copolymer ranges from 65:35 to 75:25, by weight. Some or all of the styrene in the graft copolymer may be replaced by alpha-methyl styrene.

In a preferred aspect, the invention contemplates a plastic pipe composition, based on the foregoing ingredients, containing a small amount of carbon black as a pigment for screening out ultra violet light. However, if carbon black is added directly to the composition for this purpose, the impact strength becomes seriously degraded. It has been found, unexpectedly, that if the carbon black is first pre-blended with a butadiene-acrylonitrile rubbery copolymer, and thereafter mixed with the composition of the invention, the composition retains its high impact strength and other desirable qualities. For this purpose, a mixture of 5–10 parts of butadiene-acrylonitrile rubber is premixed with 2 to 3 parts of carbon black, and this premixture is added to the composition of the invention in amount sufficient to provide from 2 to 3 parts of carbon black per 100 parts of the whole mixture. The butadiene-acrylonitrile copolymer rubber used for this purpose may be the conventional rubbery copolymer containing for example, 12 to 40% of acrylonitrile and correspondingly 88 to 60% of butadiene.

The following examples, in which all parts and percentages are expressed by weight, will serve to illustrate the compositions of the invention, as well as the preparation of the materials used in the invention.

EXAMPLE I

*Preparation of alpha-methyl styrene:acrylonitrile resin*

The alpha-methyl styrene-acrylonitrile copolymer resin employed has an intrinsic viscosity of .4 to 1.8 in dimethyl formamide, preferably .5 to 1.2. Such a copolymer may be prepared by conventional methods, using a recipe such as the following:

| Ingredients: | Parts by weight |
|---|---|
| Alpha-methyl styrene | 69 |
| Acrylonitrile | 31 |
| Mixed tertiary alkyl mercaptans (60% dodecyl, 20% hexadecyl, 20% tertiary; commercially available material known as "MTM-4") | 0.2 |
| Water | 180 |
| Emulsifiers, e.g., sodium dodecyl sulfate ("Duponol ME") and | 1.5 |
| "Tamol–N" (sodium salt of napthalene sulfonic acid condensed with with formaldehyde) | 3.0 |
| Potassium persulfate | 0.5 |

The reaction vessel is exacuated and the mixture of water, emulsifying agents and potassium persulfate is charged and heated to 140° F. The monomers and mercaptan regulator are mixed together and 10% of the mixture is charged. The balance of the mixture is charged over a period of about 3 hours. The mixture is held at about 140° F. for another 2 hours. The conversion is about 95%. The resulting latex may be coagulated to recover the resin or the latex may be blended with the latex of the graft polymer (containing antioxidant emulsion), to be described below, and then coagulated, followed by drying.

EXAMPLE II (A) *Preparation of rubber for graft copolymer*

To prepare the graft copolymer a polybutadiene rubber latex is first prepared in the conventional manner, using, for example, the following recipe:

| Materials: | Parts by weight |
|---|---|
| Butadiene | 100 |
| Water | 57 |
| Sodium rosin acid soap | 2.25 |
| Potassium persulfate | 0.3 |
| Dodecyl mercaptan | 0.25 |

Initially, the butadiene, water, potassium persulfate and mercaptan are mixed with 1 part of the soap, and heated to a temperature of 110° F. As the reaction proceeds, the temperature is gradually increased and the remainder of the soap is added in increments. About 60 hours are required for the polymerization, the maximum temperature attained being about 150° F. Latex having a large particle size is thus produced. Latex of this kind is commercially available under the designation "GR–S 2004."

(B) *Preparation of graft copolymer*

The foregoing latex is employed to make the graft copolymer as follows: eighty parts of polybutadiene latex containing 58% solids is mixed with 290 parts of water, 0.7 part of potassium persulfate, and 0.15 part of sodium hydroxide. The temperature is raised to 50° C. and 0.07 part of sodium bisulfite is added. There is added to the above mixture continuously over a period of six hours a solution of 0.2 part of sodium hydroxide and 2 parts of sodium rosin soap dissolved in water, and a mixture of 30 parts of styrene and 17.5 parts of acrylonitrile. After the soap solution and the styrene and acrylonitrile monomer mixture are added at the end of the six hour period, the batch is agitated at 50° C. for four hours additional until about 85% conversion of monomers is obtained. The total reaction time is ten hours and the product comprises 46 parts of resin to 54 parts of rubber. After adding 1 part of antioxidant, the resin-rubber latex is coagulated with calcium chloride solution and the coagulum dried.

EXAMPLE III

A resinous copolymer of 70 parts alpha-methyl styrene and 20 parts acrylonitrile, prepared as described above, was used in this example along with a graft copolymer of styrene/acrylonitrile (70/30 ratio) monomers on polybutadiene latex (46% styrene/acrylonitrile and 54% rubber solids), also prepared as described above. The resin and graft copolymer were mixed together in the proportions shown in Table I, below. Mixes A, B and C represent the invention, the mix D being included for purposes of comparison. Molded samples of the mixes were tested for impact strength and hardness, with the results noted in Table I.

TABLE I

| | Mix | | | |
|---|---|---|---|---|
| | A | B | C | D |
| Resinous copolymer of alpha-methylstyrene and acrylonitrile (percent) | 70 | 75 | 80 | 90 |
| Graft copolymer of styrene and acrylonitrile on polybutadiene (percent) | 30 | 25 | 20 | 10 |
| Approximate over-all resin/rubber ratio | 85/15 | 87.5/12.5 | 90/10 | 95/5 |
| Izod notched impact strength (ft.-lbs./inch) | 4.1 | 3.3 | 2.3 | 1.0 |
| Rockwell hardness (R scale) | 111 | 113 | 115 | 119 |

A study of the above data will reveal a unique effect in the field of gum plastics. It will be observed that there is a linear relationship between the impact strength and the hardness (strength or toughness) of the material as the rubber (polybutadiene) content of the system decreases. In conventional gum plastics, in contrast, the impact strength falls off extremely rapidly, so that in order to achieve a good impact value in the conventional system it is necessary to accept a poorer hardness and tensile strength than would be desirable. In the present system, because of the unique relationship, relatively high values of hardness and tensile strength are obtainable while still preserving high impact strength. These desirable qualities are provided in a gum plastic mixture containing appreciably less rubber than is usually required to achieve good impact strength.

EXAMPLE IV

In this example, a comparison is made between mixtures with and without carbon black. The mixtures were based on the same resinous copolymer and graft copolymer as used in Example III, and the carbon black was added in the amount shown in Table II. Molded samples were tested for impact strength and tensile strength, with the results shown in Table II.

TABLE II

| | Mix | |
|---|---|---|
| | D | E |
| Resinous copolymer (percent) | 70 | 70 |
| Graft copolymer (percent) | 30 | 30 |
| Resin/Rubber Ratio | 85/15 | 85/15 |
| Carbon black (parts per 100 of polymers) | | 2 |
| Izod notched impact strength (ft.-lbs./inch) | 4.0 | 2.7 |
| Tensile strength (p.s.i.) | 8,160 | 8,030 |

It will be observed that the carbon black caused a decrease in impact strength, although the composition containing carbon black did substantially retain its high impact strength.

EXAMPLE V

In this example the same resinous copolymer and graft copolymer as in Example I were used. Carbon black was separately masterbatched with butadiene-acrylonitrile copolymer rubber in the proportions shown in Table III, and thereafter added to the mixture. In addition to the tensile, and hardness, the heat distortion temperature was also determined, under a stress of 264 p.s.i., by standard test procedure, with the result shown in Table III. Plastic pipe was made from the mixture by extrusion (it was noted that the mixture had good extrusion qualities) and the pipe was subjected to a test procedure designed to determine what is known as the pipe working stress. In this test a sample of the pipe is subjected to internal hydrostatic pressure for an extended period of time, until the pipe finally bursts. This procedure is repeated with different samples of pipe at a number of different internal pressures, and the length of time that each sample of pipe will withstand the pressure before bursting is noted in each case. The time elapsed before failure will of course increase as the pressure is decreased. The logarithm of the time of failure is then plotted against the logarithm of the applied pressure, and the curve obtained (a straight line) may be extrapolated to a time value that is considered to represent a reasonably long term of service. In the present case a plot of results obtained at room temperature was extended to a time of 100,000 hours, while a plot of results obtained at a temperature of 160° F. was extended to a time value of 4,000 hours. The pressure corresponding to such extended time value is regarded as the pipe working pressure, and the stress value calculated for this pressure is given as the pipe working stress in Table III.

TABLE III

| | Mix F |
|---|---|
| Alpha-methyl styrene/acrylonitrile resinous copolymer (percent) | 75 |
| Graft copolymer of styrene/acrylonitrile on polybutadiene (percent) | 20 |
| Masterbatch: | |
|     Butadiene/acrylonitrile (65/35) copolymer rubber (percent) | 5 |
|     Carbon black (percent) | 2.5 |
| Resin/rubber ratio | 85/15 |
| Tensile strength (p.s.i.) | 8080 |
| Rockwell hardness (R scale) | 113 |
| Heat distortion temperature (264 p.s.i., °C.) | 105 |
| Pipe working stress at room temperature (p.s.i) | 3200 |
| Pipe working stress at 160° F. (p.s.i.) | 470 |

When the carbon black is first masterbatched with a small amount of butadiene-acrylonitrile rubber, and then added to the mixture, the final composition retains its high impact strength. While it is not desired to limit this aspect of the invention to any particular theory of operation, it appears possible that carbon black introduced directly into the mixture undergoes some unfavorable chemical interaction with one or more of the constituents of the mixture. Evidently the unfavorable effects of such interaction are somehow prevented or forestalled by first premixing the carbon black with the butadiene-acrylonitrile copolymer rubber, and then mixing that masterbatch with the resinous copolymer and the graft copolymer. It was surprising to find that the resulting total mixture provided such a good combination of desirable physical properties.

Table III also illustrates an important advantage of the composition of the invention, namely, its high heat distortion temperature. The value of 105° C. for the heat distortion temperature (at a stress of 264 p.s.i.) is indeed a very excellent one, in comparison to conventional gum plastics. This high figure for the heat distortion value indicates that the composition of the invention can be used satisfactorily at higher temperatures than have heretofore been feasible with comparable commercially available gum plastics, and the composition of the invention will retain its good strength and toughness even after an extended period of service under temperature conditions that would have a very unfavorable effect on conventional gum plastics.

Table III also shows that the pipe working stress permissible in pipe made from the present composition is indeed unusually high. The value of 3200 p.s.i. for the pipe working stress at room temperature is some two and one-half times as high as the pipe working stress value for a good conventional gum plastic. The improvement realized by the invention is even more striking in the pipe working stress value of 470 p.s.i. at 160° F., since that value is about five times higher than the typical performance of a conventional commercial gum plastic. These gratifying results in pipe working stress are far in excess of what would be expected from the tensile strength of the present composition, which exceeds that of a good conventional gum plastic by about 50%.

The excellent pipe working stress values of the present composition are indicative of the excellent resistance to "weeping" of pipe made from the present composition. In this respect, the present composition is unique among the plastics, insofar as the present inventor is aware.

Having thus described my invention, what I claim and desire to protect by Letters Patent is:

1. A thermoplastic gum plastic composition comprising a separately prepared mixture of from 68% to 85% of (A) and correspondingly from 32% to 15% of (B), the said (A) being a resinous copolymer of alpha-methyl styrene and acrylonitrile, said copolymer containing from 65 to 75 parts of alpha-methyl styrene and correspondingly from 35 to 25 parts of acrylonitrile per 100 parts of said copolymer, and the said (B) being a graft copolymer made by copolymerizing from 50 to 40 parts (per 100 parts of graft copolymer) of a monomeric mixture of styrene and acrylonitrile, the ratio of styrene: acrylonitrile being from 65:35 to 75:25, in an aqueous emulsion containing correspondingly from 50 to 60 parts of polybutadiene rubber, the said polymers (A) and (B) being the sole polymers present in the said separately prepared mixture, the said mixture of (A) and (B) being further blended with a separately prepared premix of from 5 to 10 parts of butadiene-acrylonitrile copolymer rubber, containing from 12 to 40% of acrylonitrile and correspondingly from 88 to 60% of butadiene, with from 2 to 3 parts of carbon black, the amount of said premix being sufficient to provide from 2 to 3 parts of carbon black per 100 parts of the total mixture, the said percentages, parts and ratios being by weight, and the said composition being characterized by resistance to weeping and by good physical properties at elevated temperatures.

2. A pipe made from the composition of claim 1.

References Cited by the Examiner
UNITED STATES PATENTS 3,111,501    11/1963    Thompson    260—41.5

MORRIS LIEBMAN, *Primary Examiner.*

A. LIEBERMAN, *Assistant Examiner.*